(12) United States Patent
Saida et al.

(10) Patent No.: US 8,118,087 B2
(45) Date of Patent: Feb. 21, 2012

(54) VEHICLE AIR CONDITIONING DEVICE

(75) Inventors: Yoshitaka Saida, Wako (JP); Choji Sakuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 950 days.

(21) Appl. No.: 12/122,064

(22) Filed: May 16, 2008

(65) Prior Publication Data

US 2008/0283215 A1    Nov. 20, 2008

(30) Foreign Application Priority Data

May 16, 2007   (JP) .................................. 2007-130656

(51) Int. Cl.
*B60H 1/00* (2006.01)

(52) U.S. Cl. ............. 165/202; 165/41; 165/51; 165/271

(58) Field of Classification Search ................. 165/11.1, 165/41, 42, 43, 44, 51, 202, 203, 204, 271; 62/244
See application file for complete search history.

(56) References Cited

U.S. PATENT DOCUMENTS

| | | | |
|---|---|---|---|
| 1,660,146 A * | 2/1928 | Winans ........................... | 165/41 |
| 3,823,568 A * | 7/1974 | Bijasiewicz et al. ............ | 165/42 |
| 4,417,618 A * | 11/1983 | Yoshimi et al. ............... | 165/204 |
| 4,478,274 A * | 10/1984 | Naganoma et al. ........... | 165/204 |
| 5,016,704 A * | 5/1991 | Ono ............................... | 165/203 |
| 5,284,025 A * | 2/1994 | Kajitani et al. ................. | 62/244 |
| 6,059,016 A * | 5/2000 | Rafalovich et al. ............ | 165/41 |
| 6,202,934 B1 * | 3/2001 | Kamiya et al. ................ | 165/204 |
| 7,066,245 B2 * | 6/2006 | Ebara et al. ................... | 165/202 |
| 2001/0039926 A1 | 11/2001 | Kobayashi et al. | |
| 2004/0069481 A1 * | 4/2004 | Ebara et al. ................... | 165/202 |

FOREIGN PATENT DOCUMENTS

| | | |
|---|---|---|
| DE | 3203927 A1 | 3/1983 |
| DE | 3842871 A1 | 6/1990 |
| JP | 08-081240 | 3/1996 |
| JP | 2003-170733 | 6/2003 |
| JP | 2003170733 | 6/2003 |

* cited by examiner

*Primary Examiner* — Ljiljana Ciric
(74) *Attorney, Agent, or Firm* — Rankin, Hill & Clark LLP

(57) ABSTRACT

A vehicle air conditioning device having first and second fans for forcing air through a heat exchanger, and a fan controller for controlling an operation of the first and second fans. On receiving a signal indicating that the shutter is closed, the fan controller controls the first and second fans such that the first fan is turned into an operating state and the second fan is turned into a stopped state.

3 Claims, 7 Drawing Sheets

(EMBODIMENT)

(EMBODIMENT)

VEHICLE AIR CONDITIONING DEVICE

FIELD OF THE INVENTION

The present invention relates to a vehicle air conditioning device having a shutter, a heat exchanger, and left and right fans for forcing air through the heat exchanger, which are provided in an engine compartment.

BACKGROUND OF THE INVENTION

An air conditioning device of this type is disclosed in, e.g., Japanese Patent Application Laid-Open Publication No. 2003-170733 (JP 2003-170733 A). FIG. 8 hereof shows the air conditioning device disclosed JP 2003-170733 A.

As shown in FIG. 8, the air conditioning device has an air intake port 101, a shutter 102 for opening and closing the air intake port 101, a shutter case 103 that also functions as an air channel, a heat exchanger 104, a radiator 105, first and second fans 106, 107 that are disposed in parallel with regard to the width direction of the vehicle, and an engine 108. These components are sequentially disposed in an engine compartment from a front part to a back part of the vehicle 100.

When the cabin is to be heated and the shutter 102 is closed, air is blown from the engine 108 by the first fan 106, and the air is returned toward the engine 108 from the heat exchanger 104 by the second fan 107, whereby the air is circulated.

The first fan 106 and the second fan 107 rotate in mutually opposite directions. Therefore, the pressure difference increases between the left and right sides inside the shutter case 103, and air flow noise caused by the flow of the air increases. Additionally, the air flow in the shutter case 103 tends to get disrupted, the shutter 102 may vibrate due to disruptions in the air flow, thus leaving room for improvement.

SUMMARY OF THE INVENTION

It is therefore an object of the present invention to provide a vehicle air conditioning device that minimizes noise and shutter vibration caused by the air flow in the engine compartment.

According to the present invention, there is provided an air conditioning device for a vehicle, which comprises: a shutter case disposed in an engine compartment for housing an engine of the vehicle and having in a front part thereof a shutter capable of opening and closing actions; a heat exchanger disposed rearward of the shutter case; first and second fans disposed rearward of the heat exchanger serially along a width of the vehicle for forcing air through the heat exchanger; and a fan controller for controlling an operation of the first and second fans, wherein the fan controller, when received a signal showing that the shutter is closed, turns the first fan into an operating state and the second fan into a stopped state.

The fan controller of the air conditioning device executes control to place the first fan in an operating state and the second fan in a stopped state when a shutter closing signal is received. At this time, the air in the engine compartment passes through the second fan that is in a stopped state, passes through the heat exchanger, passes through the shutter case, passes again through the heat exchanger, passes through the first fan that is in an operating state, and flows toward the engine compartment. The second fan is thus switched to a stopped state when a shutter closing signal is received, and the pressure difference inside the shutter case is therefore reduced. If the pressure difference is reduced, the air flow noise inside the shutter case can be reduced. Disruptions do not tend to occur in the air flow in the shutter case, and the possibility that disrupted air will come in contact with the shutter and cause the shutter to vibrate can therefore be reduced.

Since the second fan is in a stopped state, a low pressure difference can be maintained between the area in front of the second fan and the area to the rear of the fan, while the air inside the engine compartment is guided toward the heat exchanger. Therefore, air flow noise in the vicinity of the second fan can be reduced to a greater extent than in a case where the second fan is made to rotate in reverse.

Since one fan is in an operating state, the noise generated by the fan can be reduced by substantially half; and air flow noise, shutter vibration, and fan noise can be minimized.

Preferably, the engine compartment has a high temperature area created by heat radiated from the engine and a low temperature area, the second fan positioned in the high temperature area is turned into a stopped or non-operating state while the first fan positioned in the low temperature area is turned into an operating state when a cabin of the vehicle is heated, and the heat exchanger comprises an external heat exchanger of a heat-pump air conditioner, which functions as a heat absorber.

Thus, air from high temperature areas passes through the second fan, passes through the external heat exchanger, passes through the shutter case, passes again through the external heat exchanger, passes through the first fan, and returns to the engine compartment. When the cabin is to be heated, the hot air is caused to pass through the external heat exchanger, which functions as a heat absorber. As a result, the amount of heat absorbed by the external heat exchanger can be increased, and the heating performance can be effectively increased.

Desirably, when water for cooling the engine reaches or exceeds a predetermined temperature, the first fan positioned in a high temperature area in the engine compartment created by heat radiated from the engine is turned into an operating state while the second fan positioned in a low temperature area in the engine compartment is turned into a stopped or non-operating state, and the heat exchanger comprises a radiator of the engine.

Because, when the temperature of the cooling water has reached or exceeded a predetermined temperature, the first fan, which is disposed in the high temperature area of the engine compartment, is operated, and the second fan, which is disposed in the low temperature area of the engine compartment, is stopped, air from the low temperature area can be guided into the shutter case by the second fan.

The air from the low temperature area passes through the second fan and the radiator, is guided into the shutter case, passes through the shutter case, passes once again through the radiator, passes through the first fan, and returns to the engine compartment. Specifically, the air from the low temperature area passes through the radiator, is guided into the shutter case, passes once again through the radiator, and returns to the engine room.

When the temperature of the cooling water reaches or exceeds a predetermined temperature, the air from the low temperature area in the engine compartment is guided to the shutter case, and is caused to pass through the radiator. A suitable amount of heat can accordingly be dissipated via the radiator. The radiator suitably releases the heat, and the temperature of the cooling water can be readily kept in an optimal temperature region that is equal to or greater than the predetermined temperature.

Thus, since the temperature of the cooling water can be readily kept in an optimal temperature region, the amount of fuel consumed by the engine can be minimized, and fuel costs can be reduced. The heating performance of the heater core, in which the cooling water is used, can be stabilized.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Referring to FIGS. 1 through 6, discussion will be made as to an air conditioning device according to a first embodiment of the present invention.

Figure 1:
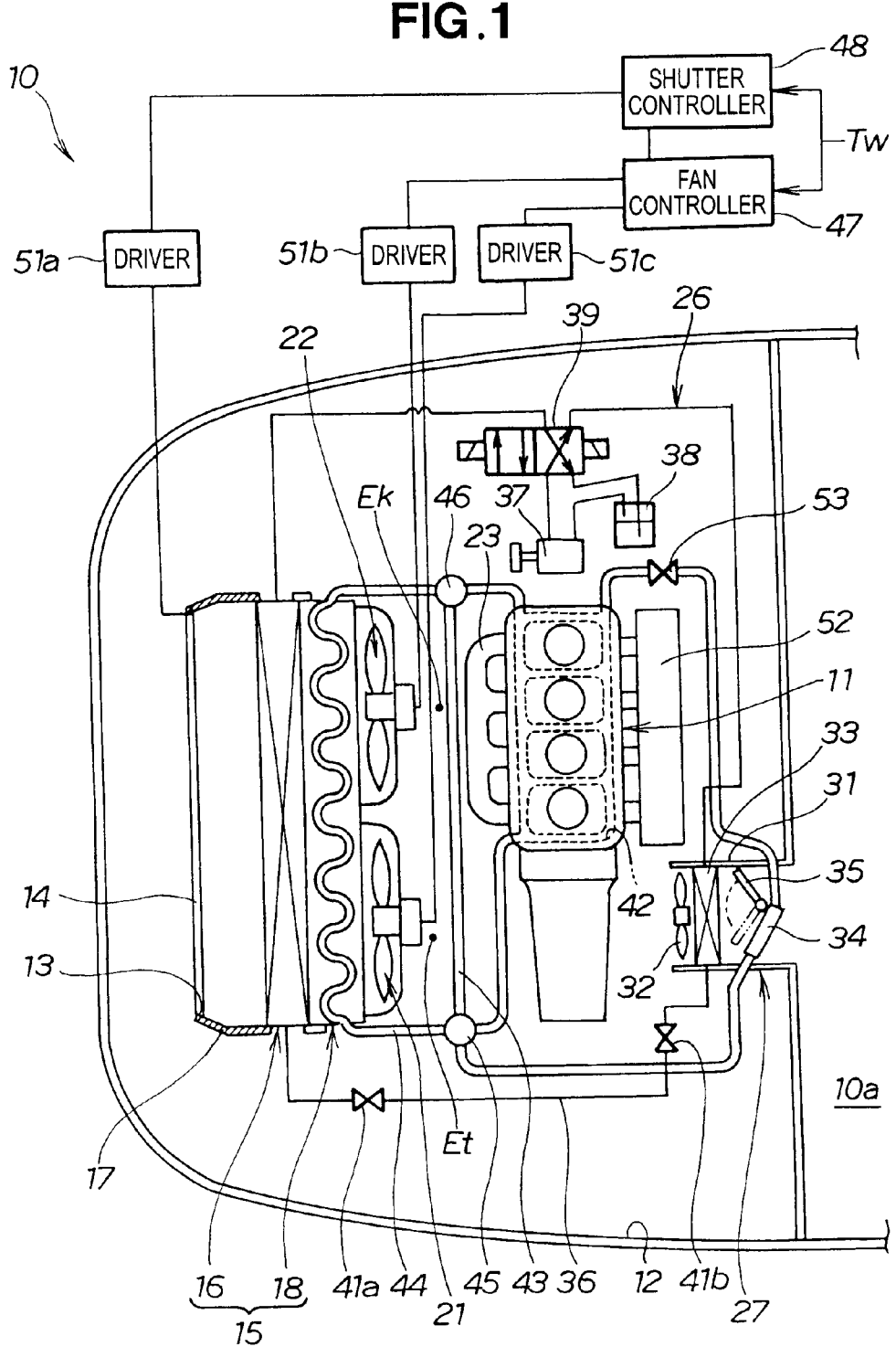
FIG. 1 is a schematic view illustrating a vehicle air conditioning device according to a first embodiment of the present invention.

As shown in FIG. 1, a vehicle 10 has a cabin 10a and an engine compartment 12. The engine compartment 12 is positioned in a front part of the vehicle 10. A shutter 14 opens and closes an air inlet 13. A heat exchanger 15 is disposed rearward of the shutter 14. The heat exchanger 15 comprises an external heat exchanger 16 and a radiator 18. A shutter case 17 is disposed between the shutter 14 and the external heat exchanger 16, and air is caused to pass through the shutter case. The radiator 18 is disposed rearward of the shutter case 17, and cools the cooling water of an engine 11. A left first fan 21 and a right second fan 22 are disposed rearward of the radiator 18 so as to be parallel with regard to the width direction of the vehicle. The engine 11 is disposed rearward of the left and right fans 21, 22. Specifically, the heat exchanger 15 is disposed between the shutter 14 and the fans 21, 22. These devices are accommodated in the engine compartment 12.

The first fan and the second fan have a function for forcing air through the heat exchanger 15.

An exhaust manifold 23, which is a heat emitting part of the engine 11, is positioned rearward of the right fan 22. In the present embodiment, a high temperature area Ek created by heat radiated from the engine 11 is positioned rearward of the right fan 22. A low temperature area Et is positioned rearward of the left fan 21.

The external heat exchanger 16 is one of the constituent elements of a heat-pump air conditioner 26. The external heat exchanger 16 functions as a heat absorber during heating and as a heat emitter during cooling.

The heat-pump air conditioner 26 has an internal unit 27 that communicates with the cabin 10a. The internal unit 27 has a frame 31; a cabin fan 32 that is disposed in the opening of the frame 21, and that draws air into the cabin 10a; an internal heat exchanger 33 that is disposed rearward of the cabin fan 32; a heater core 34 that is used for heating and that is disposed rearward of the internal heat exchanger 33; and an air mix damper 35 that is disposed forward of the heater core 34, and that regulates the amount of the air that passes through the heater core 34.

A refrigerant pipe 36 is connected between the external heat exchanger 16 and the internal heat exchanger 33 so as to circulate a refrigerant. A compressor 37, an accumulator 38, a four-way valve 39, and valves 41a, 41b that can adjust the flow rate are disposed along the pipe 36.

In the cooling system of the engine 11, an outer jacket 42 of the engine 11 and the radiator 18 are connected by a water pipe 44. A water pump 45 and a thermostat 46 are disposed along the water pipe 44. The water pipe 44 is provided so as to circulate water between the outer jacket 42 and the heater core 34. Reference numeral 43 indicates a bypass water pipe.

The left and right fans 21, 22 are connected to a fan controller 47 for controlling the operating state and stopped state of the fans. A shutter controller 48 controls the shutter 14 so as to be in an open state to allow exterior air to be introduced, or in a closed state to block the flow of exterior air.

In the drawings, reference numerals 51a, 51b, and 51c indicate drivers; 52 indicates an intake manifold; and 53 indicates a water valve.

Figure 2:
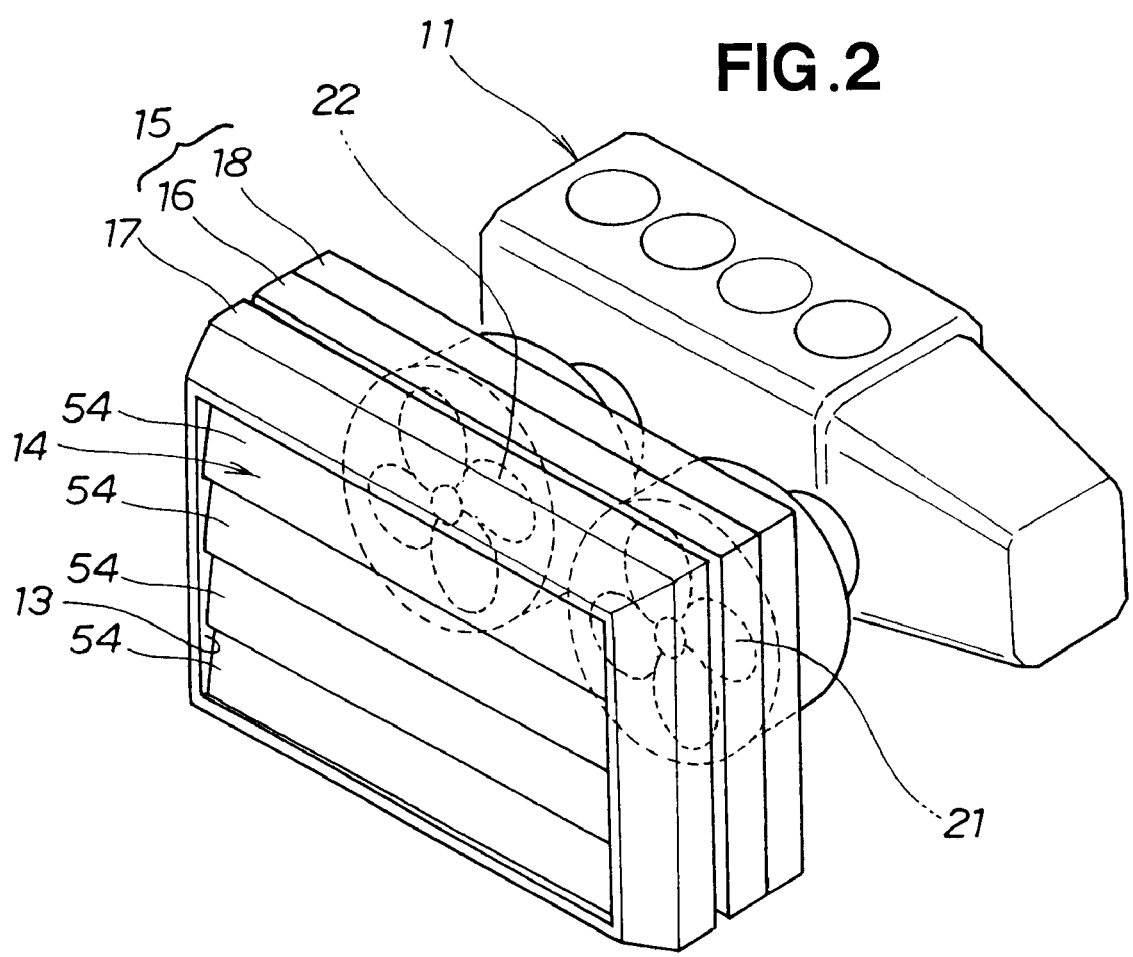
FIG. 2 is a perspective view showing a shutter, a shutter case, a heat exchanger, and an engine shown in FIG. 1.

FIG. 2 shows the engine 11, shutter 14, heat exchanger 15, and the left and right fans 21, 22 shown in FIG. 1.

The shutter 14 comprises a plurality of openable and closeable louver boards 54. The shutter 14 is supported by the shutter case 17. The heat exchanger 15 is disposed rearward of the shutter case. When the plurality of louver boards 54 is in an opened state, air passes through the shutter case 17. The left and right fans 21, 22 are disposed rearward of the heat exchanger 15.

Figure 3A:
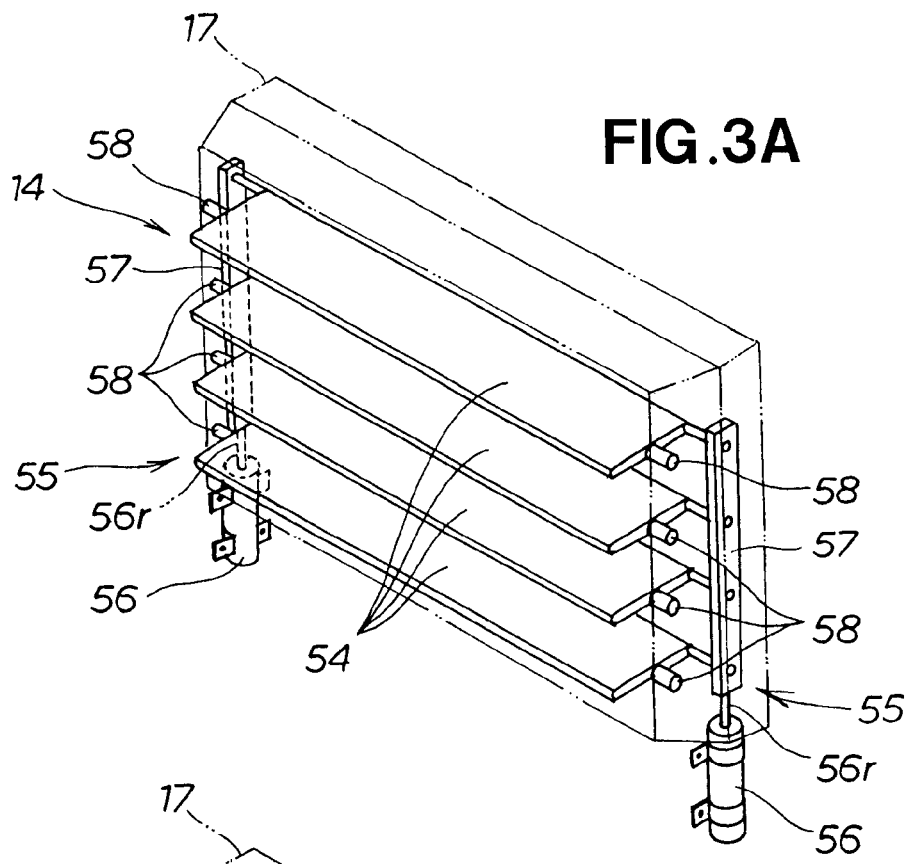
FIGS. 3A and 3B illustrate the shutter being opened and closed.

As shown in FIGS. 3A and B, the shutter 14 is supported by the shutter case 17, which surrounds the periphery of the shutter 14. The shutter 14 is opened and closed by shutter opening/closing mechanisms 55, 55.

As shown in FIG. 3A, the shutter opening/closing mechanisms 55, 55 comprise cylinder units 56, 56 that are provided to the vehicle; and arm members 57, 57 that are connected to rods 56r, 56r of the cylinder units 56, 56, and that move in the vertical direction. The arm members 57, 57 are connected to each of the louver boards 54 via board support shafts 58. The arm members 57, 57 move downward due to the retraction of the rods 56r, 56r of the cylinder units 56, 56; and the louver boards 54 rotate around the board support shafts 58, and an open state is achieved.

Figure 3B:
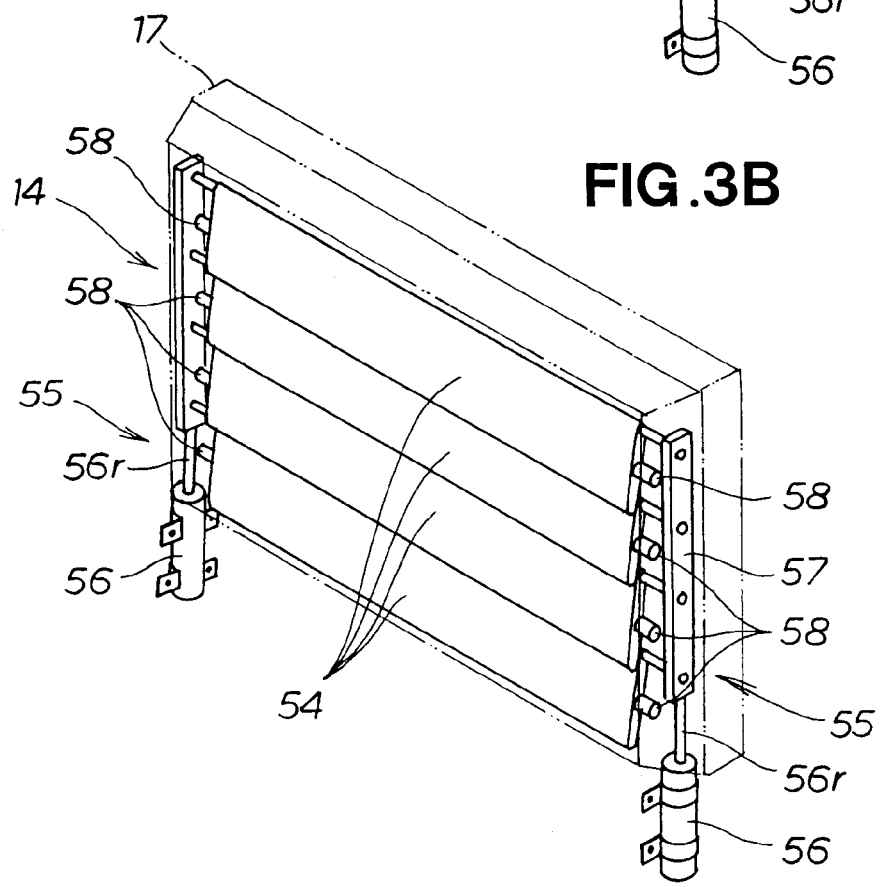

In FIG. 3B, when the rods 56r, 56r of the cylinder units 56, 56 advance, the arm members 57, 57 move upward, the louver boards 54 rotate around the board support shafts 58, and a closed state is achieved.

The movement of the air flow in the engine compartment will be described below with reference to FIG. 4A through D. FIG. 4C shows the pressure distribution in the engine compartment in the air conditioning device of the first embodiment shown in FIG. 4A. FIG. 4D shows the pressure distribution in the engine compartment according to the prior art shown in FIG. 4B. In FIGS. 4C and D, the horizontal axis shows points in the engine compartment, the vertical axis shows the pressure, and the dashed line shows the atmospheric pressure.

Figure 4A:
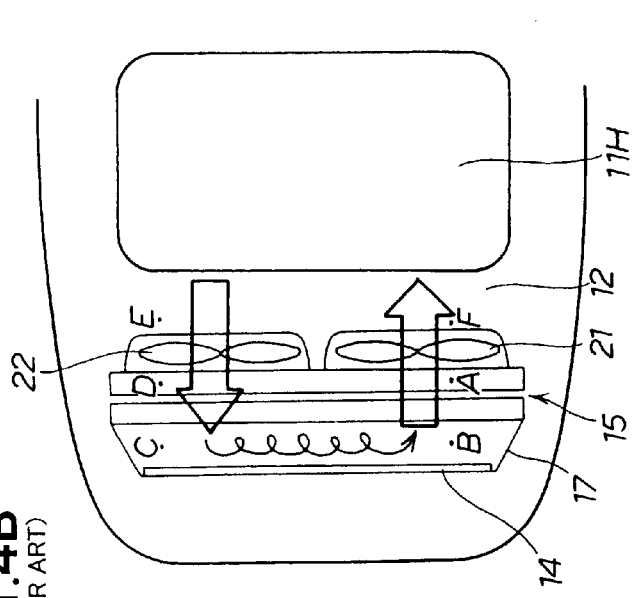
FIGS. 4A through 4D are views illustrating a comparison between the air flow during heating and pressure distribution at several points in the first embodiment and the prior art.

In FIG. 4A, when the fan controller 47 (FIG. 1) receives a signal indicating that the shutter 14 is closed from the shutter controller 48 (FIG. 1), the fan controller carries out a control procedure so that the left fan 21 is switched to an operating state (normal rotation) and the right fan 22 is switched to a stopped state.

At this time, the air inside the engine compartment 12 passes through the right fan 22, which is in a stopped state, the heat exchanger 15, and the shutter case 17; subsequently passes again through the heat exchanger 15 and the left fan 21, which is in an operating state; and is then guided into the engine compartment.

Figure 4B:
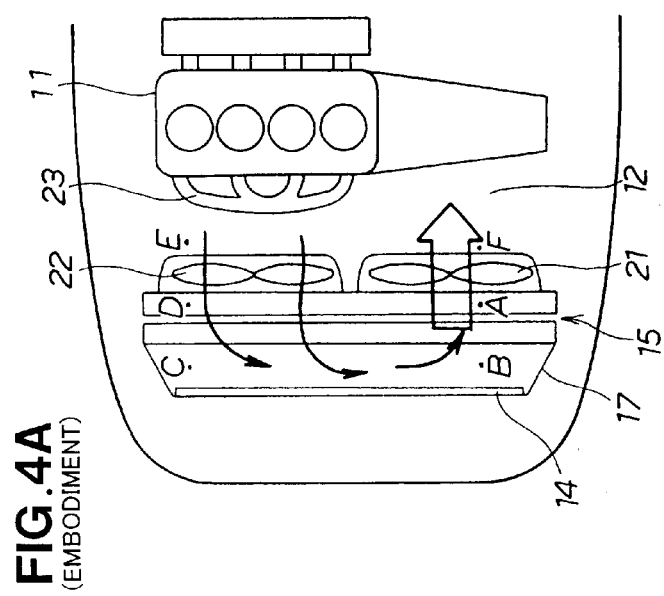
Figure 4C:
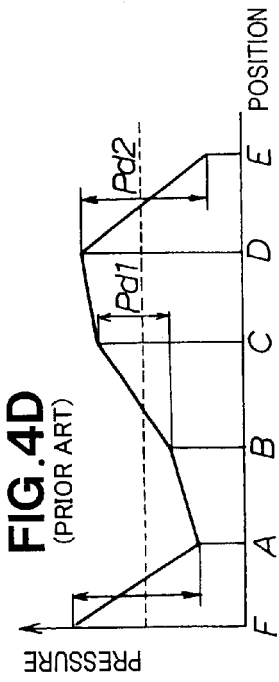
Figure 4D:
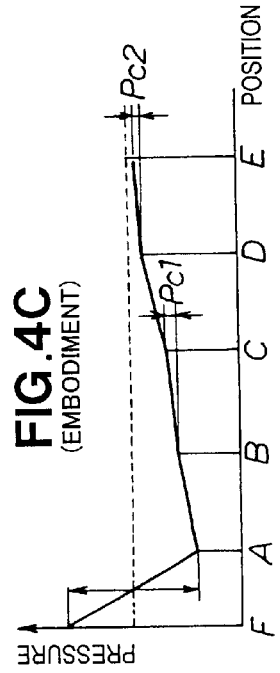

FIG. 4B shows a state in which the left fan 21 is caused to rotate in the normal direction and the right fan 22 is caused to rotate in reverse. The air generated from the engine 11H in the engine compartment 12 passes through the right fan 22 that is rotating in reverse, the heat exchanger 15, and the shutter case 17; subsequently passes again through the heat exchanger 15 and the left fan 21 that is rotating in the normal direction; and is then guided to the engine compartment 12.

When a comparison is made between FIG. 4C and FIG. 4D, the pressure differences between point B and point C are Pc1 and Pd1, respectively, and these values have the relationship Pc1<Pd1. The pressure differences between point D and point E are Pc2 and Pd2, and these values have the relationship Pc2<Pd2.

In the first embodiment, since the right fan 22 is stopped, the pressure difference between point B and point C in the shutter case 17 is lower than the pressure difference shown in the prior art, and Pc1<Pd1. If the pressure difference decreases, the air flow noise in the shutter case 17 will decrease. Disruptions in the air flow will tend not to occur in the shutter case 17; therefore, the likelihood of the air flow hitting the shutter 14 and the shutter 14 vibrating is reduced.

In the first embodiment, the pressure difference between the areas rearward (point E) and forward (point D) of the right fan 22 is lower than the pressure difference shown in the prior art, and Pc2<Pd2. If the pressure difference decreases, it will be possible for the air in the engine compartment 12 to be guided into the heat exchanger 15 with minimal restriction. Therefore, the air flow noise in the vicinity of the right fan 22 can be reduced considerably more than in a case where the right fan 22 is made to rotate in reverse.

In the first embodiment, one of the two fans 21, 22 rotates, and the noise generated from the fans 21, 22 in the prior art can therefore be reduced by substantially half. Therefore, in the engine compartment 12, air flow noise, shutter vibration, and fan noise can be minimized.

The rotation of the right fan 22 disposed in the high temperature area Ek (FIG. 1) in the engine compartment 12 is stopped, and the left fan 21 disposed in the low temperature area Et (FIG. 1) in the engine compartment 12 is caused to rotate. Therefore, the air in the high temperature area Ek passes through the external heat exchanger 16 (FIG. 1) and the shutter case 17 from the right fan 22.

The air that has passed through the shutter case 17 again passes through the external heat exchanger 16, passes through the left fan 21, and is returned to the engine compartment 12. Thus, the hot air is caused to pass through the external heat exchanger 16, which functions as a heat absorber when the cabin 10a is to be heated, whereby the amount of heat that is absorbed by the external heat exchanger 16 can be increased. If the amount of heat absorbed by the external heat exchanger 16 is increased, the heating performance in the cabin 10a (FIG. 1) will be effectively improved.

Figure 5B:
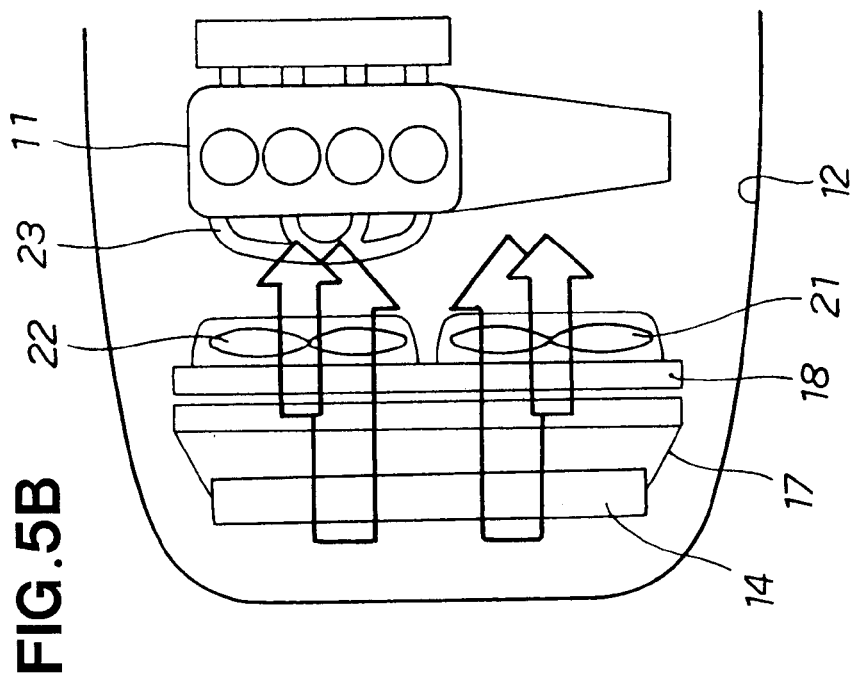
FIGS. 5A and 5B are schematic views showing the air flow when the temperature of the cooling water is within a predetermined temperature range, and when the temperature has increased to or exceeded a predetermined temperature.
Figure 5A:
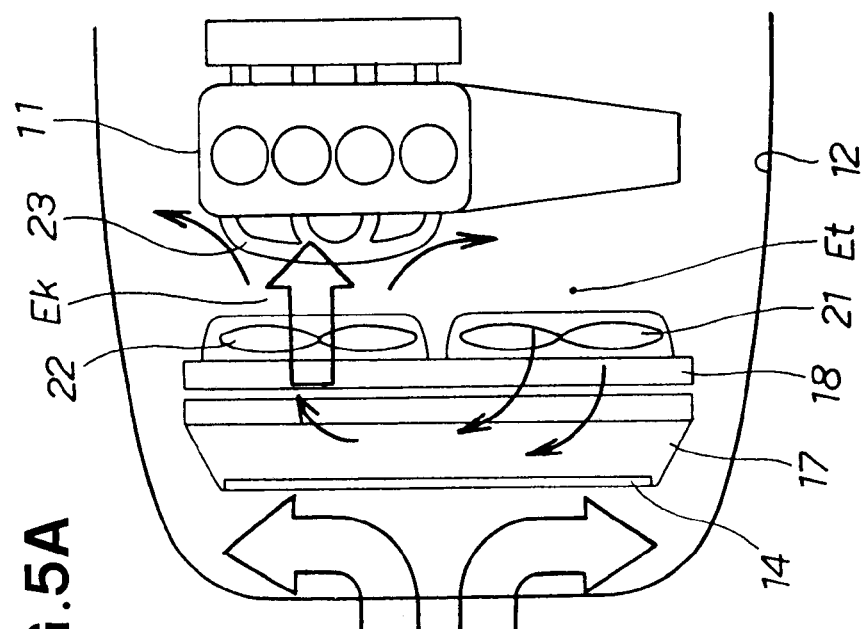

FIGS. 5A and 5B show the operation of the shutter 14 and the fans 21, 22 when the temperature ($T_W$) of the cooling water is within a predetermined temperature range and when the temperature rises to a predetermined temperature or greater.

In the engine compartment 12, the right fan 22 is disposed near the exhaust manifold 23 where the high temperature area Ek is formed, and the left fan 21 is disposed in the low temperature area Et.

In FIG. 5A, when the temperature (Tw) of the cooling water reaches or exceeds a predetermined temperature (T1), the right fan 22, which is disposed in the high temperature area Ek in the engine compartment 12, is operated; and the left fan 21, which is disposed in the low temperature Et in the engine compartment 12, is kept in a stopped state.

The air in the low temperature Et passes through the stopped left fan 21, the radiator 18, and the shutter case 17; subsequently passes again through the radiator 18 and the right fan 22; and is guided to the engine room 12.

When the temperature of the cooling water reaches or exceeds a predetermined temperature (T1), the shutter 14 is closed, the air in the low temperature area Et in the engine compartment 12 is guided into the shutter case 17, and caused to pass through the radiator 18. Heat can therefore be suitably dissipated by the radiator 18. Since the radiator 18 can suitably dissipate heat, the temperature of the cooling water can be readily kept in an optimal temperature region that is equal to or greater than a predetermined temperature.

The temperature (Tw) of the cooling water can thus be readily kept in the optimal temperature region; therefore, the amount of fuel consumed by the engine 11 can be minimized, and the fuel costs can be reduced. It is possible to stabilize the heating performance of the heater core in which the cooling water is used.

In FIG. 5B, when the temperature (Tw) of the cooling water rises from T1 to a predetermined temperature (T2) or higher, the shutter 14 is opened, the left fan 21 and the right fan 22 are operated, exterior air is drawn in, the exterior air is caused to pass through the radiator 18, and the radiator is cooled.

Figure 6:
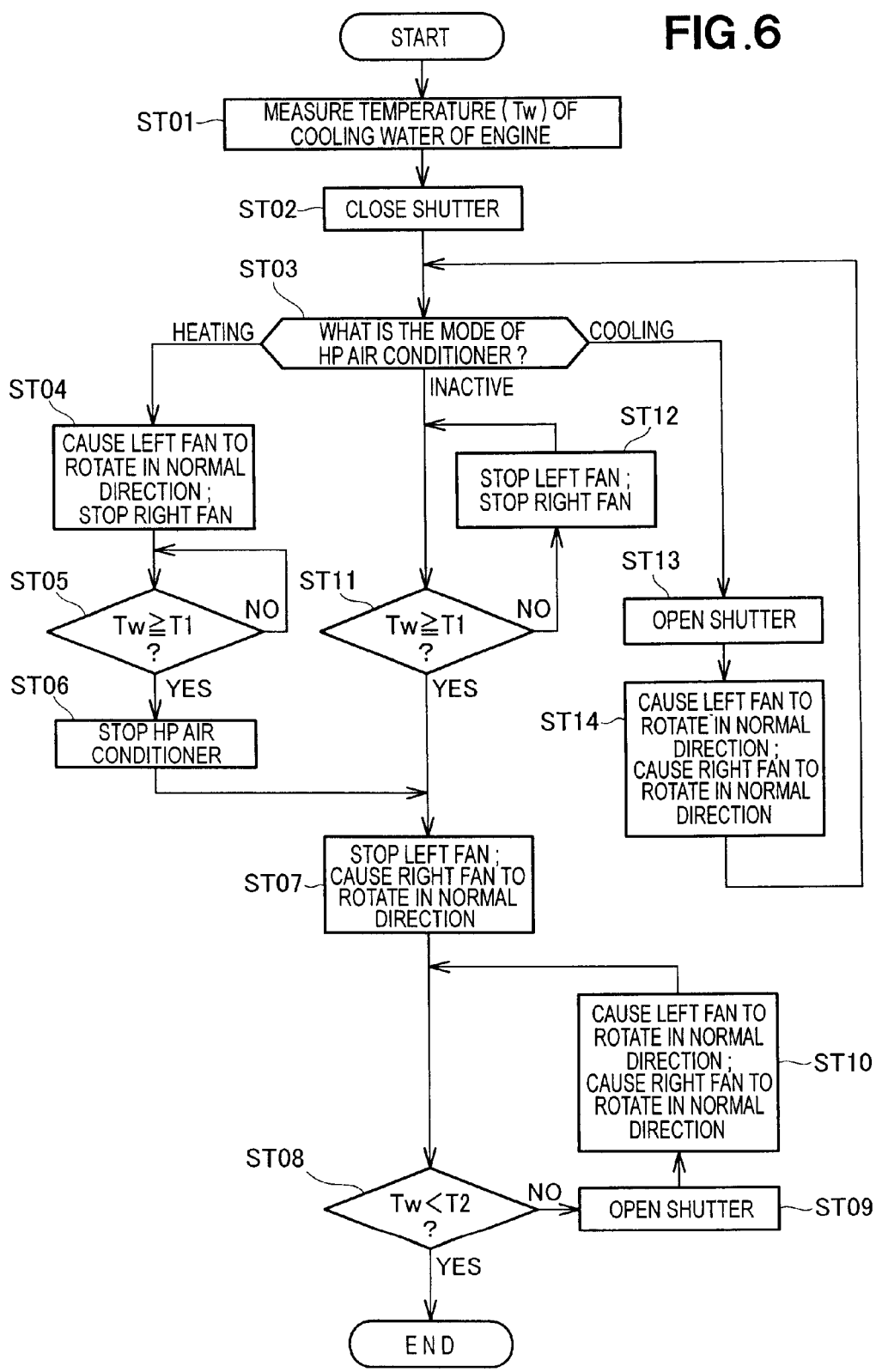
FIG. 6 is a flowchart of control the air conditioning device according to the first embodiment.

FIG. 6 shows the flow for controlling the devices provided to the engine compartment according to the first embodiment.

In step (abbreviated as ST below) 01, the temperature (Tw) of the cooling water of the engine 11 is measured, and the shutter 14 is closed by a command from the shutter controller 48 (ST02).

In ST03, the mode to which the heat-pump air conditioner 26 is set is determined. If the mode is a heating mode, the left fan 21 is caused to rotate in the normal direction and the right fan 22 is stopped in ST04.

In ST05, a decision is made as to whether the temperature (Tw) of the cooling water is a first setting value (T1). If Tw is determined to be T1 or greater, the heat pump-type (HP) air conditioner 26 is stopped. As a result, heating by the heater core 34 alone will be sufficient, and the heater core 34 can be used to heat the cabin. T1 is, e.g., about 70° C.

In ST07, the left fan 21 is stopped and the right fan 22 is caused to rotate in the normal direction.

In ST08, a decision is made as to whether the temperature (Tw) of the cooling water is below a second setting value (T2). If the temperature (Tw) of the cooling water has not increased to the second setting value (T2), the process returns to the start. If the temperature (Tw) of the cooling water has increased to or exceeded the second setting value (T2), the shutter 14 is opened (ST09), the left fan 21 and the right fan 22 are caused to rotate in the normal direction (ST10), and exterior air is caused to pass through the radiator 18. The temperature (Tw) of the cooling water can thereby be cooled by the radiator to a temperature below the second setting value (T2). T2 is, e.g., 95° C.

When the mode is the stopped mode in ST03, a decision is made in ST11 as to whether the temperature (Tw) of the cooling water has reached the first setting value (T1). If Tw has not reached T1, the left fan 21 and the right fan 22 are stopped (ST12). The temperature (Tw) of the cooling water can thereby be rapidly increased to T1. The process proceeds to ST07 when Tw reaches T1 or higher.

When the mode is a cooling mode in ST03, then in ST13 the shutter 14 is opened, the left and right fans 21, 22 are caused to rotate in the normal direction (ST14), exterior air is caused to pass through the external heat exchanger 16, and the process proceeds to ST03. As a result, the amount of heat dissipated by the external heat exchanger 16, which functions as a heat emitter, can be increased; and the cooling performance can be improved.

Figure 7:
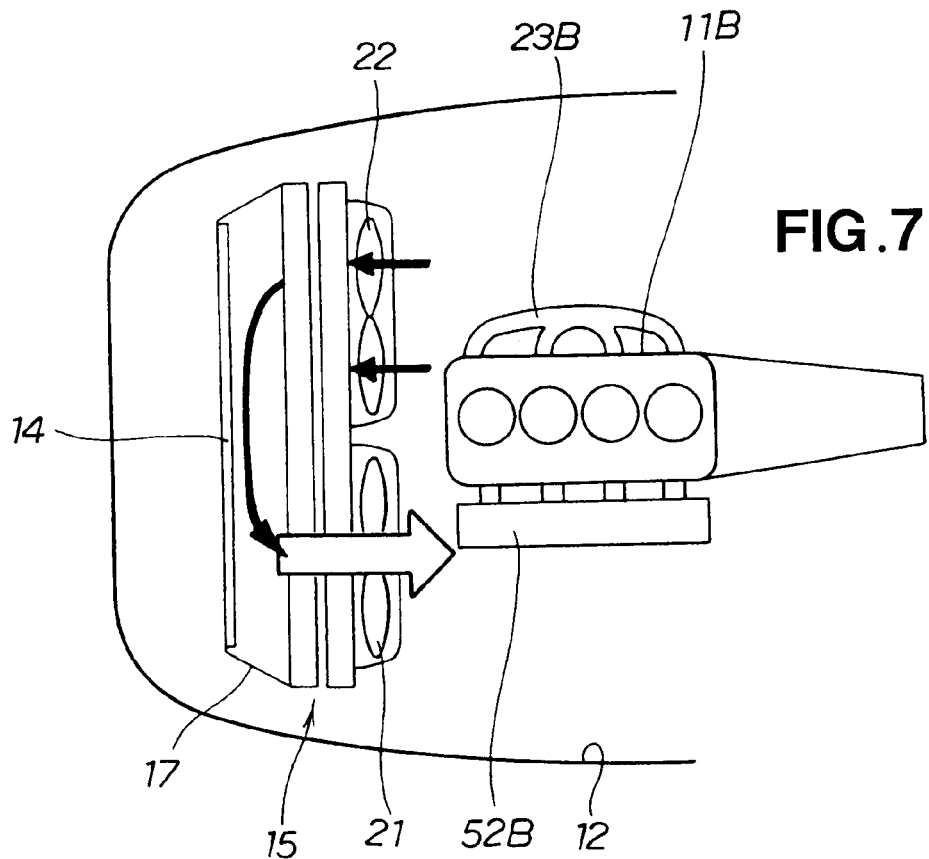
FIG. 7 is a schematic view showing an air conditioning device according to a second embodiment of the present invention.
Figure 8:
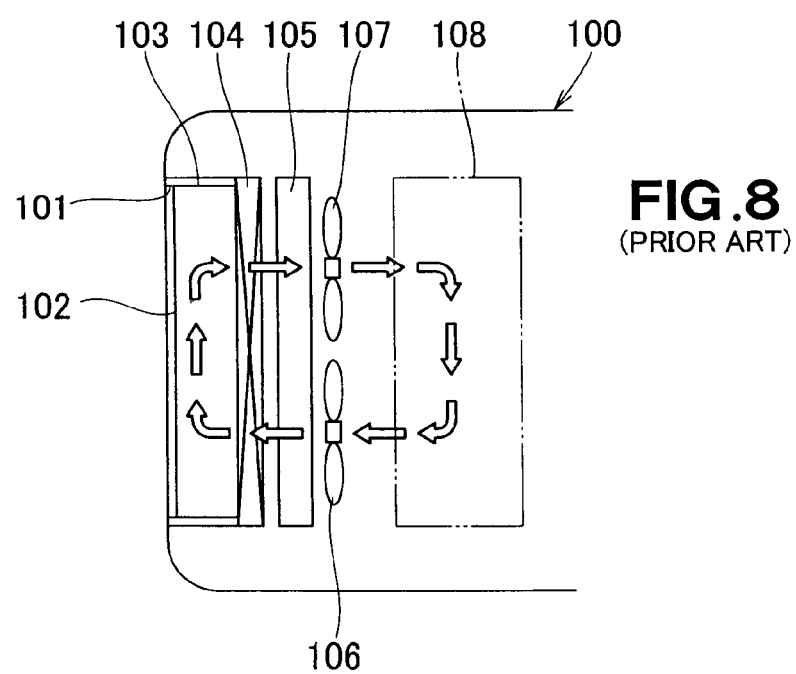
FIG. 8 is a schematic view showing a conventional air conditioning device.

FIG. 7 shows an air conditioning device according to a second embodiment. A main difference thereof with respect to the first embodiment is that the cylinders of the engine 11B are arranged in the same direction as the longitudinal direction of the vehicle.

As with the first embodiment, the right fan 22 is disposed in an area near an exhaust manifold 23B, which is the high temperature area Ek in the engine compartment 12; the left fan 21 is disposed in an area near an intake manifold 52B, which is the low temperature area Et; the left fan 21 is placed in an operating state; and the right fan 22 is placed in a stopped state.

Only the left fan 21 is operated, whereby the pressure difference in the shutter case 17 can be reduced, and the air flow noise in the shutter case can be reduced. The likelihood of the shutter 14 vibrating is low.

Since the pressure difference between the interior and exterior sides of right fan 22 is low, the air flow noise near the right fan 22 can be reduced.

Obviously, various minor changes and modifications of the present invention are possible in light of the above teaching. It is therefore to be understood that within the scope of the appended claims the invention may be practiced otherwise than as specifically described.

What is claimed is:

1. An air conditioning device for a vehicle, comprising:
    a shutter case disposed in an engine compartment for housing an engine of the vehicle and having in a front part thereof a shutter capable of opening and closing actions;
    a heat exchanger disposed rearward of the shutter case;
    first and second fans disposed rearward of the heat exchanger serially along a width of the vehicle for forcing air through the heat exchanger; and
    a fan controller for controlling an operation of the first and second fans,
    wherein the fan controller, when received a signal showing that the shutter is closed, turns the first fan into an operating state and the second fan into a stopped state.

2. The air conditioning device of claim 1, wherein the engine compartment has a high temperature area created by heat radiated from the engine and a low temperature area, the second fan disposed in the high temperature area is turned into a stopped state while the first fan positioned in the low temperature area is turned into an operating state when a cabin of the vehicle is heated, and the heat exchanger comprises an external heat exchanger of a heat-pump air conditioner, which functions as a heat absorber.

3. The air conditioning device of claim 1, wherein, when cooling water for cooling the engine reaches or exceeds a predetermined temperature, the first fan positioned in a high temperature area in the engine compartment created by heat radiated from the engine is turned into an operating state while the second fan positioned in a low temperature area in the engine compartment is turned into a stopped state, and the heat exchanger comprises a radiator of the engine.

* * * * *